Feb. 11, 1936.
H. R. STANDLEE
WELL SPIDER
Original Filed May 12, 1934
Re. 19,852
4 Sheets-Sheet 1
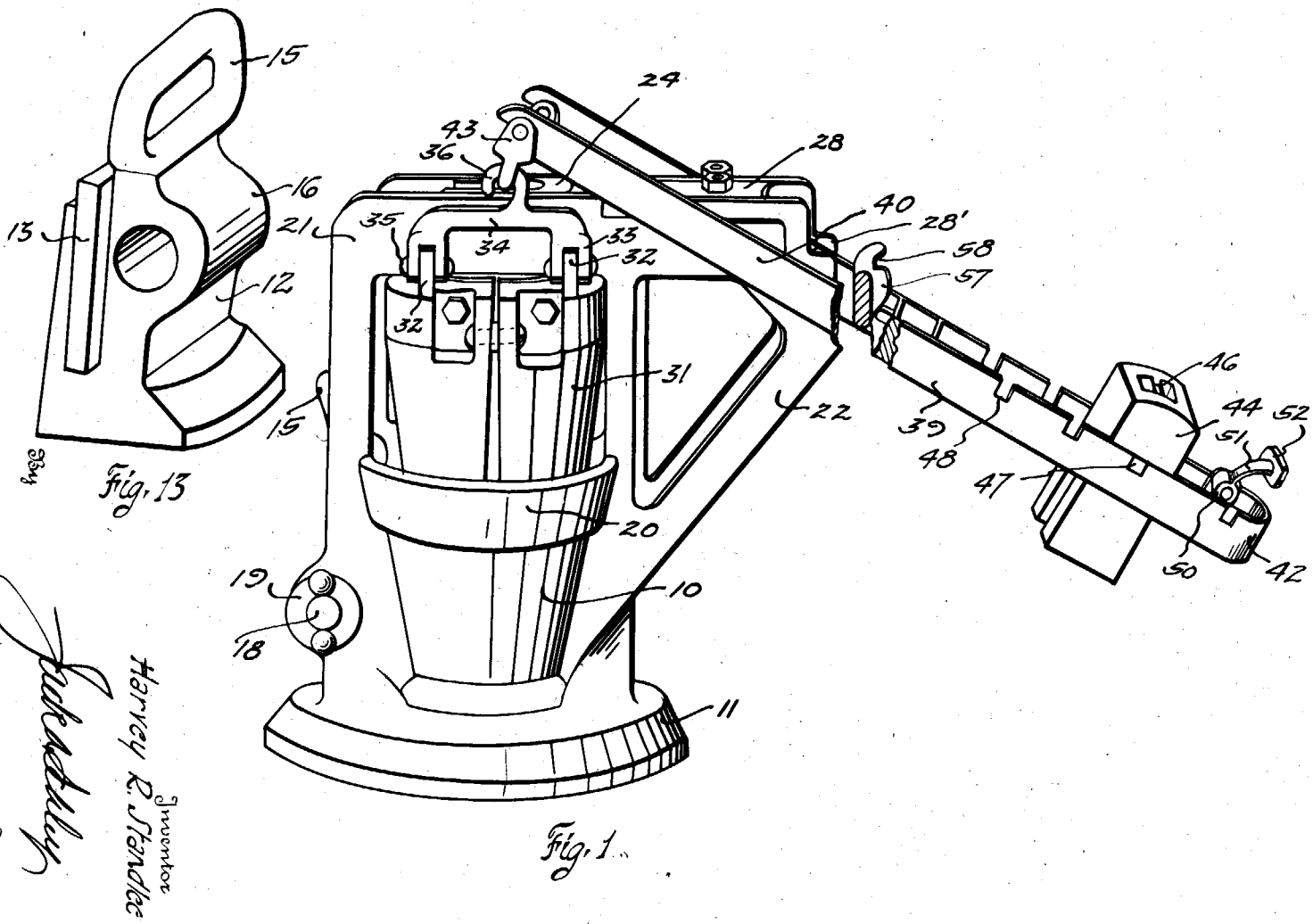
Inventor
Harvey R. Standlee
By Jack Ashley
Attorney Feb. 11, 1936. H. R. STANDLEE Re. 19,852
WELL SPIDER
Original Filed May 12, 1934 4 Sheets-Sheet 2
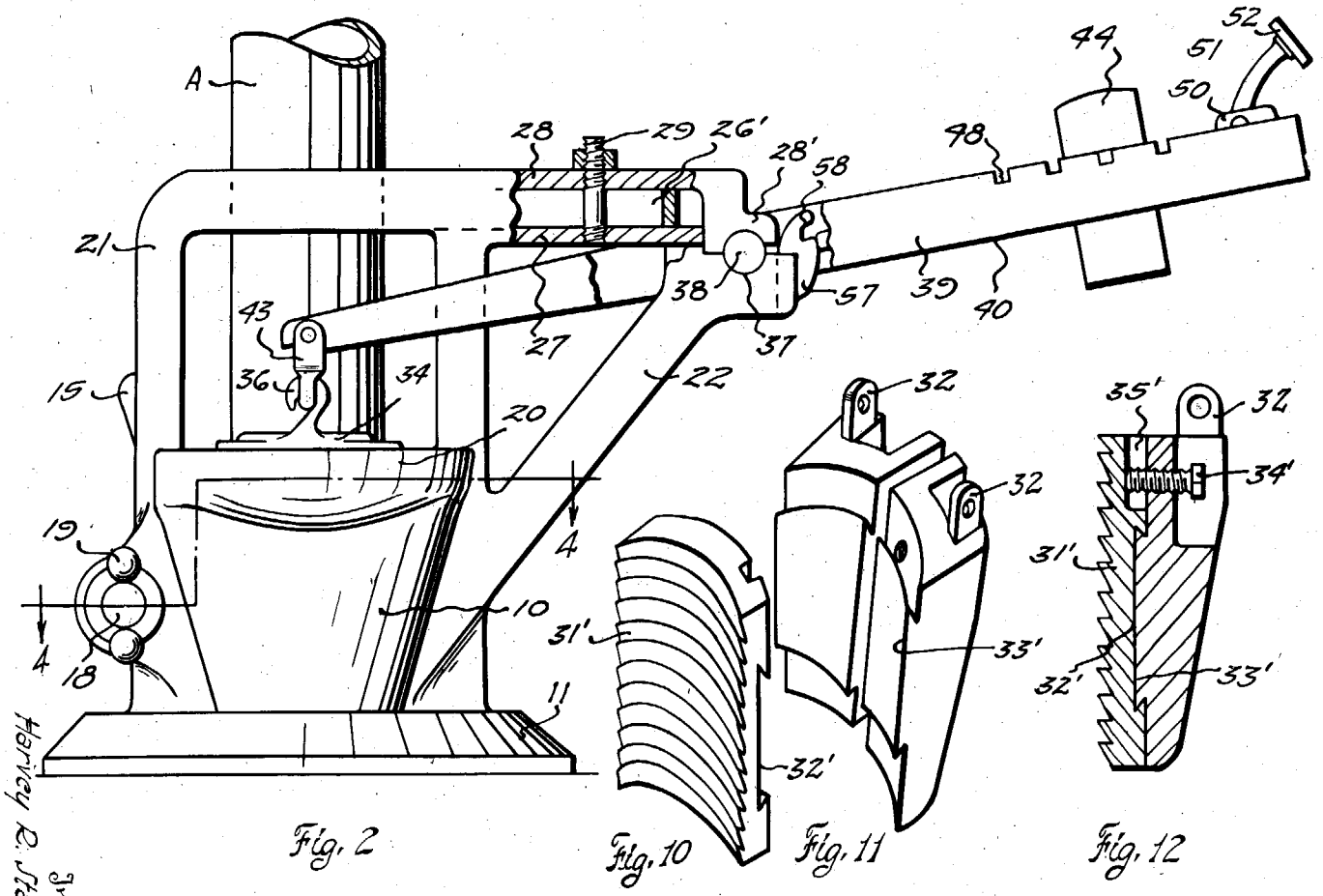
Inventor
Harvey R. Standlee
By Jack A. Ashley
Attorney Feb. 11, 1936. H. R. STANDLEE Re. 19,852

WELL SPIDER

Original Filed May 12, 1934 4 Sheets-Sheet 3

Inventor
Harvey R. Standlee

By Jack A. Ashley

Attorney

Feb. 11, 1936. H. R. STANDLEE Re. 19,852
WELL SPIDER
Original Filed May 12, 1934 4 Sheets-Sheet 4
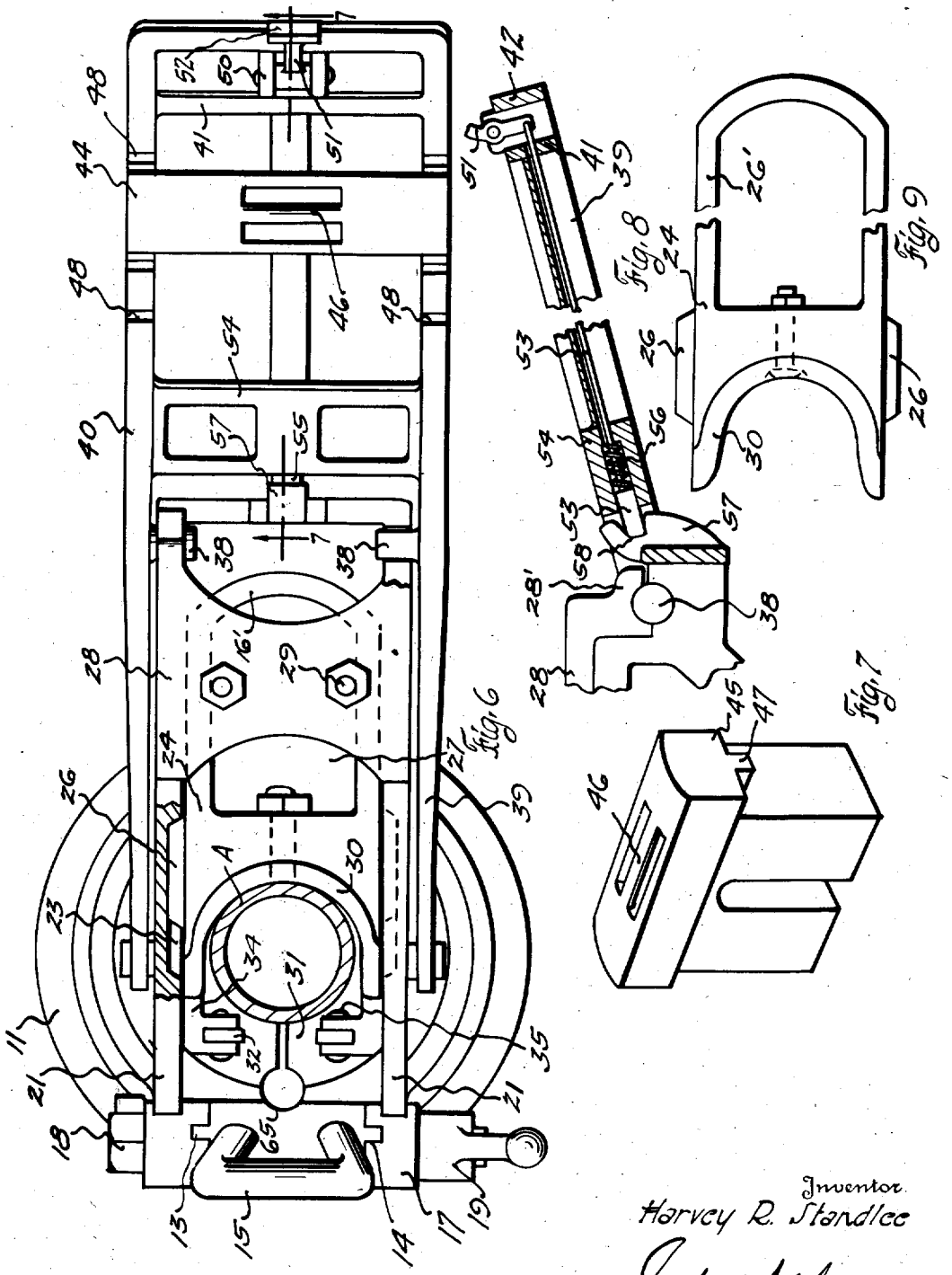
Inventor
Harvey R. Standlee
By Jack Ashley
Attorney Reissued Feb. 11, 1936

Re. 19,852

UNITED STATES PATENT OFFICE 19,852

WELL SPIDER

Harvey R. Standlee, Tulsa, Okla., assignor to The Guiberson Corporation, Dallas, Tex., a corporation of Delaware Original No. 1,999,519, dated April 30, 1935, Serial No. 725,340, May 12, 1934. Application for reissue July 22, 1935, Serial No. 32,659

7 Claims. (Cl. 24—263)

This invention relates to new and useful improvements in well spiders.

One object of the invention is to provide a spider involving certain improvements upon that shown in my co-pending application filed November 15, 1933, Serial No. 698,122, which has matured into Patent No. 1,966,906, issued July 17, 1934.

A particular object of the invention is to provide an improved spider especially adapted to heavy duty work, where long strings of tubing or pipe are to be handled.

An important object of the invention is to provide the operating lever with a latch so arranged as to be manually actuated, preferably by the foot of the workman; whereby the slips may be locked against displacement from the bowl; also whereby the slips will be automatically locked in case the string of tubing or pipe is dropped or falls.

A further object of the invention is to provide slips having liners constructed in an improved manner, whereby said liners may be securely held in place or readily removed.

Another object of the invention is to provide the guide with a removable bushing for adapting it to different sizes of tubing and pipes.

Still another object of the invention is to provide a more rigid support for the tubing guide and at the same time to reinforce the bowl and to improve the symmetry of the spider to make for safety and more ready handling.

A construction designed to carry out the invention will be hereinafter described, together with other features of the invention.

Figure 4:
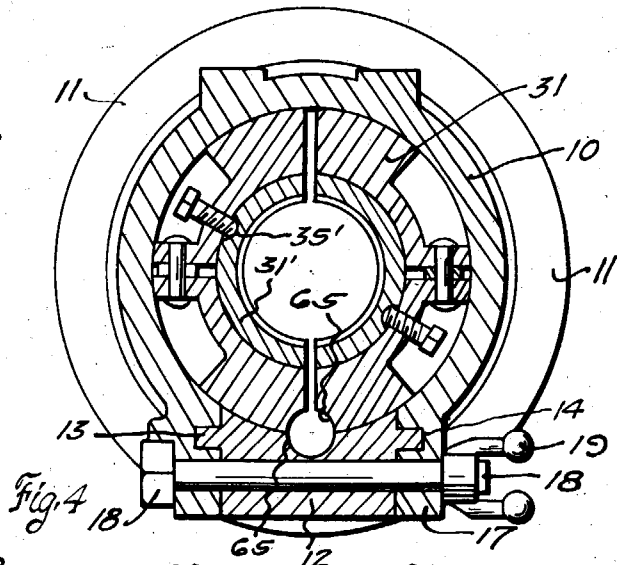
Figure 5:
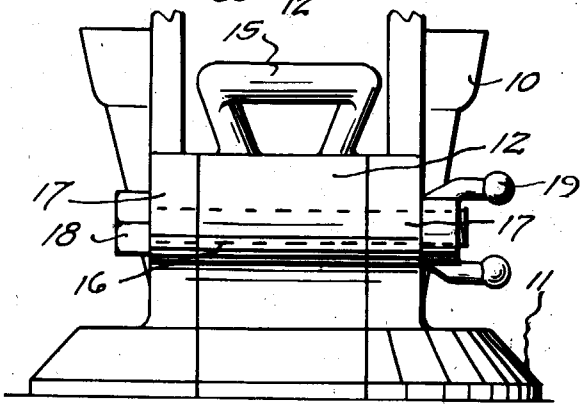
Figure 3:
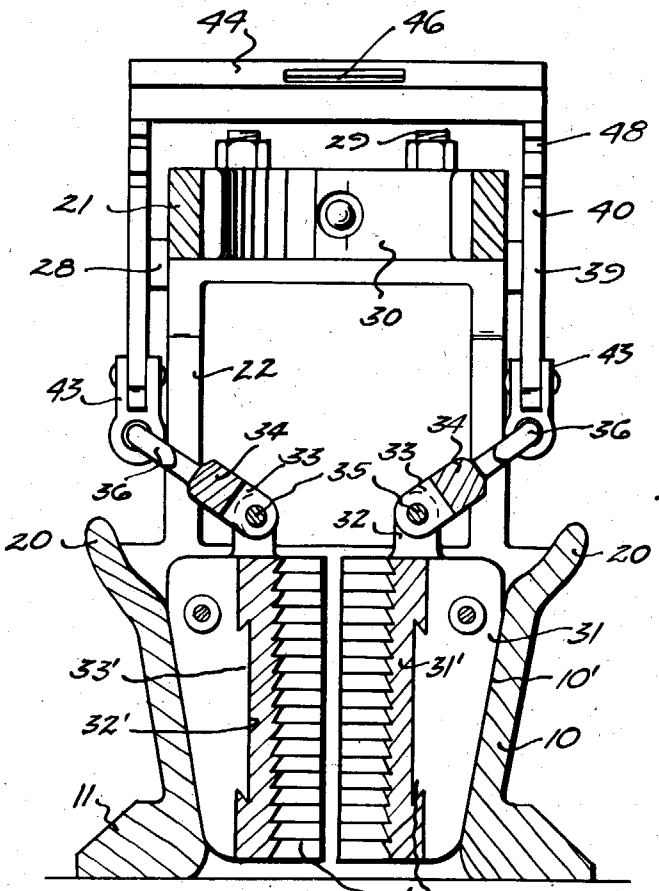

The invention will be more readily understood from a reading of the following specification and by reference to the accompanying drawings, in which an example of the invention is shown, and wherein:

Figure 1 is a perspective view of a spider constructed in accordance with the invention and showing the slips retracted or elevated and the lever unlatched, Figure 2 is a side elevation of the same showing the slips gripping a tubing and the lever latched, Figure 3 is a transverse vertical sectional view of the spider, Figure 4 is a horizontal cross-sectional view taken on line 4—4 of Figure 2, Figure 5 is a front elevation of the bowl, Figure 6 is a plan view, having parts in section, Figure 7 is a perspective view of the counterbalancing weight, Figure 8 is a longitudinal sectional view taken on the line 7—7 of Figure 6, Figure 9 is a plan view of the guide yoke, Figure 10 is a perspective view of the slip liner, Figure 11 is a perspective view of the slip body, Figure 12 is a vertical sectional view of one of the slips, and Figure 13 is a perspective view of the gate.

In the drawings the numeral 10 designates the bowl of the spider which is provided with a beveled annular base flange 11 adapted to be fastened in a casing head or adapter (not shown). The bowl is provided in its front side with a gate 12. The gate has vertical guides 13 (Figures 4, 6, and 13) on each side slidable in channels 14, whereby the gate may be slid upwardly, but is held against outward displacement when closed. A looped handle 15 is formed on top of the gate for use in sliding it from the bowl.

When the gate is opened or removed a gap is left which is wide enough to receive the tubing or casing for which the spider is adapted. This permits the spider to be placed around a string of tubing or casing, simply by removing the gate; and obviates the necessity of making the bowl in diametrically split sections. The gate has a transverse cored boss 16 on its outer side located between ears 17 on the bowl. A heavy bolt 18 passes through the ears 17 and boss and receives a wing nut 19, whereby the parts are drawn together. The bowl including the gate has an upwardly inclined or flared bore 10′ as is best shown in Figure 3. On opposite sides outwardly curved lips 20 are formed on the upper edges of the bowl.

Upright arches 21 cast integral with the bowl extend above the same in substantially parallel relation, having their front uprights on each side of the gate. Each arch has a triangular bracket 22 at its rear portion. A guide yoke 24 (Figure 9) is formed with short longitudinal ribs 26 on each side engaging in longitudinal grooves 23 in the top members of the arches (Figure 6), whereby the yoke may be slid between said arches radially of the bowl. In order to fasten the yoke in its adjusted positions, its U-shaped shank 26′ is clamped between a web 27 and a keeper plate 28. The web is cast across the bottom of the top bars of the arches, while the plate 28 is slipped into the top edges of said bars at their ends. Bolts 29 engaged in the web hold the plate and shank in place.

The yoke has a removable bushing 30 bolted in its front end. The term "tubing" as used hereinafter is intended to cover casing or any tubular or cylindrical member which might be used in the spider. The yoke overhangs the bowl and the bushing is preferably U-shaped and made deep enough to receive more than half the diameter of the tubing. The yoke is adjusted to engage the tubing A (Figures 1 and 6) and center it axially in the bowl. The string of tubing will be run up and down through the yoke and the bushing is wide enough to permit the coupling collars to pass therethrough. The rounded edges will prevent catching of the collars. The yoke may be inverted if desired.

In order to support the tubing in the bowl some kind of slips are required, but the invention is not to be limited to the particular kind of slips or to the means for operating the same, because the slips could be removed and replaced by hand, but such a method is dangerous and I prefer to use mechanical means for raising and lowering the slips.

I prefer to use toothed slips 31 which are arranged in pairs disposed on opposite sides of the bore 10' of the bowl. The slips illustrated are similar to those shown in my Letters Patent No. 1,864,953, issued June 28, 1932, and provided with removable liners 31'. The slips of each pair are provided with eyes 32 engaging between ears 33 on the ends of a spreader yoke or hanger 34 and loosely hung on pins 35 (Figures 1 and 3) fastened in said ears. The spreader yokes are disposed substantially parallel of the arches 21 and each has an outwardly bent hook 36 at its center, whereby it and its slips may be suspended. Each liner 31' has a dovetailed groove 32' in its rear wall and this groove receives a dovetailed rib 33 formed on each slip member. A locking screw 34', threaded through the slip engages a vertical slot 35' in the upper end of each liner (Fig. 12) to hold said liner against radial displacement. The dovetailed engagement prevents vertical displacement. By providing the liners, it is obvious that the size of the slips are quickly changed to accommodate different size tubing.

The brackets 22 have fulcrum sockets 37 at their upper rear ends for receiving trunnions 38 cast on the inner sides of the side bars 39 of a U-shaped lever 40. These sockets are below the top bars of the arches and the fulcrums are confined therein by keepers 28'. By removing the plate 28 the lever may be removed from its sockets.

The forward end of each side bar 39 has loosely pivoted thereto a clevis 43 receiving one of the hooks 36, whereby the slips 31 are suspended by the lever 40. When the lever is swung to the position shown in Figures 2 and 3, the slips are slid down the inclined bore 10' of the bowl into gripping engagement with the tubing A. Upon swinging the lever downwardly the slips are elevated to the position shown in Figure 1. When the slips are swung upwardly they strike the tops of the arches 21, as is shown in Figure 1, whereby a positive stop is provided. The lips 20 prevent the lower ends of the slips from swinging out of the bowl and this is a very important feature. As the slips move upwardly in the flared bore 10', they are spread apart, thus releasing the tubing. By observing Figure 3, it will be seen that the lips 20 are dished and the lower outer edges of the slips are rounded.

With the slips in their uppermost position the lower ends of the same will be in engagement with the dished surfaces of said lips. This will permit the slips to nearly swing out of the bore 10', thus giving ample clearance for passage of collars and the like. The dished surfaces of the slips are sufficiently inclined to displace the lower ends of said slips into the bore of the bowl when the slips are lowered.

A very useful feature of the invention is a counter-balancing weight 44 slidably disposed between the side bars 39 of the lever and having laterally directed side flanges or shoes 45 engaging on the top edges of said bars. The weight is formed with a loop handle 46 and lugs 47 on the under sides of the shoes engage in notches 48 in the side bars, whereby the weight is held against sliding when the lever is swung. By lifting the weight sufficiently to withdraw the lugs from their notches, said weight may be moved along the lever and thus adjusted. This weight counter-balances the slips and has numerous advantages as will be hereinafter pointed out.

It is necessary during certain operations to lock the lever 40 in position. The lever is formed with a handle 42 across its rear end and a transverse bar 41 is provided inwardly of the handle. Webs 50 are cast between the handle and bar as is shown in Figures 6 and 8 for pivotally supporting a foot lever 51. This lever has a foot pedal 52 extending upwardly and overhanging the handle. A plunger 53 extends longitudinally within the lever 40 and has its rear end projecting through the bar 41 and pivoted to the lower end of the lever 51.

The lever 40 has a boss 54 adjacent the keeper plate 28 and this boss is counterbored to receive the plunger 53 and its head 55. A coiled spring 56 in the bore of the boss urges the plunger head forwardly. At the center of the rear end of the plate 28 a vertical latch keeper 57 is formed. The keeper has a notch 58 for receiving the head 55 and locking the slips in their lowered position, as is shown in Figures 2 and 8.

By observing Figs. 4 and 6 it will be seen that a vertical opening 65 is provided at the forward portion of the spider. This opening extends through the entire spider and may be formed by cutting out a portion of the slips and the gate, as shown. A cable or gas line may be inserted through this opening into the well casing when the slips are engaging the tubing.

In using the spider the gate 12 is removed so that the bowl 10 may be moved forwardly, whereby the tubing is passed through the gap left by the gate and received in the bore 10'. The bowl may then be lowered onto the casing head or other support (not shown). The bowl is rotated so that the string of tubing A, if not hanging in the center of the bore, will contact with the rear side of said bore which is opposite the bracket 21. The string of tubing will also be received in the crotch 30 of the yoke 24.

By loosening the nut 29' to free the bolt 29, the yoke 24 may be slid forwardly, whereby the tubing A will be shifted to the center of the bore of the bowl so as to hang axially of said bore. By positioning the spider as above described the tubing will bear against the guide and thus be held in a central position substantially concentric to the bore of the bowl. The bushing 30 in the yoke may be changed to further provide for adjustment When the spider is placed in position the slips 31 may be elevated as is shown in Figures 2 and 4, and the weight 44 will have been adjusted on the lever 40 to hold said slips in their elevated position.

After the spider has been placed in position and the adjustments made it is ready for operation. The tubing A is raised or lowered, as the case may be, to the point where it is desired to suspend the same by the spider. To accomplish the gripping of the tubing the workman merely has to grasp the handle 42 and swing the lever 40 from the position shown in Figure 2 to the position shown in Figure 1. The slips dropping into the downwardly inclined bore 10' will engage around the tubing and when the lever is released from its suspension, the teeth of the slips will immediately grip the tubing in the usual way. Because of the centering of the tubing by the guide 24 the slips will be induced to more uniformly grip said tubing. It is obvious that if the tubing were permitted to bear against the side of the bore, the slips on the side would grip the tubing before those on the other side, thus taking only a partial hold on the tubing. The simplicity of setting the slips and the uniform gripping of the same is an important feature.

In operating the slips the workman may stand at the end of the lever, whereby he is at least two feet from the tubing and is not required to bend over the bowl or to place the fingers near the slips. He is thus protected from injury and is not likely to inhale the gas fumes rising from the well, nor are his eyes subjected to the poisonous gases which rise from the wells in some fields. The safety features, the sure gripping and guide of the tubing are pointed out as advantages of the invention.

The weight 44 may be adjusted so as to equally counterbalance the slips 31 and thus when the tubing is elevated the slips will be lifted thereby, owing to the gripping contact. The tubing will lift the slips sufficiently to cause them to swing the lever 40, whereby the weight will over-balance said slips and continue to swing the lever until the parts reach the position shown in Figure 2. The slips striking the guide and the flanges will be arrested and their further movement prevented. In some cases where the well is flowing there is danger of dropping the tubing when a considerable portion thereof has been removed. In such instances the operator prefers to allow the slips to remain in the bowl when the tubing is elevated, whereby they are in position to instantly grip the tubing in case it should fall. To accomplish this it is merely necessary to move the weight 44 forwardly toward the fulcrum bar 38. When this adjustment is made the slips will drop back into the bowl when the tubing is elevated because said slips will quickly free themselves from the tubing and the weight of said slips will be sufficient to hold the lever in its down position.

In using the spider with larger well tubing and heavier work, it has been found that when the slips are in a lowered position (Fig. 2) and in engagement with the tubing, tools, such as an elevator, which are swung against the upper end of the suspended tubing will jar said tubing. The jarring or rebound of the tubing will cause the slips to be jerked upwardly in the bowl permitting the tubing to creep downwardly, a few inches at a time. To hold the slips in a fixed lower position, the head 55 of the plunger is engaged in the notch 58 of the keeper 57 (Fig. 8). The notch is so positioned that the head will not engage therein until after the slips have reached their lowermost position.

In operating the locking means, the lever 40 is swung upwardly to the position until the slips reach their lowermost position in the bowl. At this time the slips can travel no further and the head 55 of the plunger is just below the notch of the latch, and is not engaging therein. To engage the head in the notch, the operator swings the lever 40 upwardly and during this time, the slips remain stationary, the swing of the lower end of the lever being taken care of by the swing of the pivotal connections 34 of said lever to the slips. When the head is in engagement with the notch it is obvious that the slips and lever are locked in position.

For releasing the locking means the operator merely pushes the foot pedal 52 to disengage the head from the notch, and permit the slips to be swung to a raised position.

When using the spider it is necessary to raise and lower the slips a number of times per minute, and the operator stands at the end of the spider, raising the lever 40 into locking position with his hands, and lowering said lever with his foot. It is seen that the lever is held in a lowered position by the operator's foot which is resting on the handle 42. Should any of the well rigging break, or other accident occur, the operator need only take his foot off the handle and the weight of the slips will automatically swing the lever upwardly to cause the slips to grip the tubing A. The sudden release and the rapid swinging of the lever plus the momentum of said lever attained during the swinging will cause the head 55 of the plunger to engage the notch 58, thereby automatically locking the slips and securely holding the tubing A.

It is pointed out that the bushing 30 may be removed from the guide yoke and a larger or smaller one substituted therefor when it is desired to handle a tubing of different diameter. In the manufacture of the spider all parts may be cast and it is only necessary to machine the bore 10' and the slips. This makes for economical manufacture.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent is:

1. A well spider comprising, a bowl, means overhanging the bowl for entering a tubing string in said bowl, gripping slips engaging in said bowl, means for moving said slips upwardly and downwardly in said bowl below said centering means, and a latch for locking said slips in their lowered position.

2. A well spider comprising, a bowl, means overhanging the bowl for centering a tubular string in said bowl, gripping slips engaging in said bowl, means for moving said slips upwardly and downwardly in said bowl and below said centering means, adjustable counter-balancing means for the slips for controlling their position when the string is lifted, and a latch for locking said slips in their lowered positioned.

3. A well spider comprising, a bowl, a guide overhanging the bowl for centering a tubular string axially in said bowl, gripping slips co-acting with the bowl to grip a tubular string, means for moving said slips upwardly and downwardly in said bowl below said guide, and a latch for locking said slips in their lowered position.

4. A well spider comprising, a bowl, a guide overhanging the bowl for centering a tubular string axially in said bowl, gripping slips co-acting with the bowl to grip a tubular string, means for moving said slips upwardly and downwardly in said bowl below said guide, a stop for limiting the upward movement of said slips to retain their lower ends within the bowl, and a latch for locking said slips in their lowered position.

5. A well spider comprising, a bowl, a guide overhanging the bowl for centering a tubular string axially in said bowl, gripping slips co-acting with the bowl to grip a tubular string, means for moving said slips upwardly and downwardly in said bowl below said guide, a counter-balancing weight carried by said slip-moving means, and a latch for locking said slips in their lowered position.

6. A well spider comprising, a bowl, slips in the bowl, a fulcrum having spaced journals, a U-shaped lever having pivoted connections with slips at one end and a cross handle at its opposite end, trunnions intermediate the ends of the lever engaging in the journals of the fulcrum, a weight slidable in the lever between the fulcrum and the handle, means for holding the weight in adjusted positions on the lever, and a latch for locking said slips in their lowered position.

7. A well spider comprising, a bowl having a gate for placing it about a tubular string suspended in a well, an upright support mounted on the bowl, a guide carried by the support and overhanging the bowl for engaging a tubing string and centering it axially in said bowl, a removable bushing in the guide, slips for engaging a tubular string in said bowl, and a latch for locking said slips in their lowered position.

HARVEY R. STANDLEE.